United States Patent
Mauchamp et al.

(10) Patent No.: US 7,037,367 B2
(45) Date of Patent: May 2, 2006

(54) CONCRETE SURFACE RETARDERS

(75) Inventors: John Mauchamp, Saillenard (FR); Philippe Antoine, Larnaud (FR); Dany Vincent, Louhans (FR); Kati Hazrati, Arlington, MA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 183 days.

(21) Appl. No.: 10/689,925

(22) Filed: Oct. 20, 2003

(65) Prior Publication Data

US 2005/0081751 A1    Apr. 21, 2005

(51) Int. Cl.
*C08L 91/00*    (2006.01)
*C08L 89/00*    (2006.01)
*C04B 40/00*    (2006.01)

(52) U.S. Cl. .................. 106/148.1; 106/822; 106/823; 106/148.51; 106/2; 427/331

(58) Field of Classification Search ............. 106/148.1, 106/822, 823, 148.51, 244, 148.5, 2; 427/331
See application file for complete search history.

(56) References Cited

U.S. PATENT DOCUMENTS

| 4,134,956 A | 1/1979 | Suzuki et al. ............... 264/256 |
| 4,205,040 A | 5/1980 | Aoyama et al. ............ 264/233 |
| 4,360,333 A | 11/1982 | Fox et al. ................... 425/299 |
| 4,500,552 A * | 2/1985 | Kadison et al. ............... 426/96 |
| 4,514,556 A | 4/1985 | Sawa et al. ................. 528/117 |
| 4,748,788 A | 6/1988 | Shaw et al. .................... 52/742 |
| 4,762,563 A | 8/1988 | Colin .......................... 106/97 |
| 4,967,839 A | 11/1990 | Carpenter et al. ........... 166/293 |
| 5,334,242 A * | 8/1994 | O'Toole ..................... 106/711 |
| 5,344,490 A | 9/1994 | Roosen et al. .............. 106/778 |
| 5,358,049 A | 10/1994 | Hale et al. ................... 166/293 |
| 5,435,842 A | 7/1995 | Mukaida et al. ............ 106/672 |
| 5,728,209 A | 3/1998 | Bury et al. ................. 106/819 |
| 5,794,401 A | 8/1998 | Shaw et al. .............. 52/741.41 |
| 5,912,283 A | 6/1999 | Hashizume et al. ........ 523/213 |
| 6,569,924 B1 | 5/2003 | Shendy et al. ................. 524/5 |
| 2003/0049359 A1 * | 3/2003 | Kulkarni et al. ............ 426/551 |

FOREIGN PATENT DOCUMENTS

| EP | 0 328 158 B1 | 4/1985 |
| EP | 0 180 630 B2 | 4/1995 |
| WO | WO 85/05066 | 11/1985 |
| WO | WO 97/05679 | 2/1997 |

OTHER PUBLICATIONS

Betty Crocker's Cookbook, Published Oct. 1978), pp. 157 and 289.*
W. R. Grace Construction Products, "Surface Retarders", www.graceconstruction.com Mar. 2003.
W. R. Grace Construction Products, "Pieri Product Guide" www.graceconstruction.com Aug. 2002.

* cited by examiner

*Primary Examiner*—Elizabeth D. Wood
(74) *Attorney, Agent, or Firm*—Craig K. Leon

(57) ABSTRACT

Surface retarder compositions of the invention comprise at least one surface retarder active suspended in a vegatable oil or derivative thereof, an animal oil or derivative thereof, or mixtures thereof. Methods involving use of the compositions are also described.

23 Claims, No Drawings

CONCRETE SURFACE RETARDERS

FIELD OF THE INVENTION

The present invention relates to compositions and methods for retarding the surface of concrete materials, and particularly to surface retarder compositions having vegetable oil or animal oil.

BACKGROUND OF THE INVENTION

"Surface retarders" are compositions used for treating the surface of concrete compositions. Fresh concrete containing aggregates is poured and leveled, and then the surface retarder is sprayed onto the surface at a rate of approximately 200 $g/m^2$. After a number of hours, the treated surface is washed off with a jet of water under high pressure to remove uncured cement and to expose the aggregates on the surface.

At present, surface retarders have been water-based or solvent-based. In other words, the retarding agent "actives" (e.g., sucrose, organic acids or their salts, etc.) are either dissolved in water or suspended in a solvent.

Water-based and solvent-based surface retarders, however, have respective advantages and disadvantages. For example, the solvent-based ones, which are derived from petroleum distillates, are typically less sensitive to the effects of rain and sun, but are not favored from an environmentalist's viewpoint. The water-based surface retarders, while environmentally friendly, suffer in terms of performance when exposed to high heat or sunlight, because they are susceptible to evaporation.

Accordingly, novel surface retarders are needed in view of these respective disadvantages.

SUMMARY OF THE INVENTION

In surmounting the disadvantages of the prior art, the present invention provides surface retarder compositions comprising at least one cement retarding active component dispersed within a vegetable oil or derivative thereof, an animal oil or derivative thereof, or a mixture of such oils or derivatives.

Exemplary methods of the present invention thus comprise applying the surface retarder composition to a hydratable cementitious material surface (e.g., concrete); and removing a portion of the treated surface after the cementitious material begins to cure, thereby revealing an "etched" surface portion beneath the removed surface portion. It is contemplated that conventional set retarder components or ingredients, which hereinafter may be referred to more simply as "actives," can be successfully deployed, individually or in combination with other actives (and optional components such as pigments, fillers, etc.), in compositions and methods of the invention.

One comparative advantage of set retarder compositions of the present invention is that they provide a wet film coating, which, in turn, provides retarder actives a favorable opportunity to penetrate into the hydratable cementitious surface. When this ability to penetrate into the wet concrete is maintained, the efficacy with which the surface retarder permits etching of the treated surface is keenly preserved. Conversely, if the coating evaporates or otherwise fails to disperse the retarder actives (whereby they are no longer "active"), then the etching capability is severely diminished or lost.

The advantage of the present invention is particularly evident, for example, in heat resistance testing. The present inventors discovered that while solvent-based surface retarders perform better than water-based retarders in high heat situations, due to the relatively faster evaporation rate of water, the vegetable oil-based and animal oil-based retarders of the invention perform better than solvent-based retarders, while at the same time providing an environmentally friendlier product due to the fact that natural ingredients are employed.

Other features and advantages of the invention are described in greater detail hereinafter.

DETAILED DESCRIPTION OF EXEMPLARY EMBODIMENTS

As used herein, the terms "cement" and "cementitious composition" (which are synonomous with "cement composition") are understood to refer to pastes, mortars, and concrete compositions comprising a hydratable cement binder. The terms "paste", "mortar" and "concrete" are terms of art: "pastes" are mixtures composed of a hydratable cement binder (usually, but not exclusively, Portland cement, masonry cement, or mortar cement, and this binder may also include limestone, hydrated lime, fly ash, granulated blast furnace slag, pozzolans, and silica fume or other materials commonly included in such cements) and water; "mortars" are pastes additionally including fine aggregate (e.g., sand), and "concretes" are mortars additionally including coarse aggregate (e.g., crushed gravel, stone). The cementitious compositions tested in this invention may be formed by mixing required amounts of certain materials, e.g., a hydratable cement, water, and fine and/or coarse aggregate, as may be applicable to make the particular cement composition being formed.

All percentages of components described or claimed herein shall be in terms of total weight of the composition unless otherwise indicated.

An exemplary surface retarder composition of the invention comprises at least one cement set retarding active component (which may simply be referred to as an "active" or "retarding active") that is dispersed in a vegetable oil or derivative thereof, an animal oil or derivative thereof, or a mixture of said oils or derivatives thereof. Preferably, the amount of vegetable oil, animal oil, and/or derivative thereof is 1–98% by total weight of the composition, more preferably 25–92% by total weight of the composition, and most preferably 50–90% by total weight of the composition.

It is contemplated that conventional retarding actives are suitable for use in the present invention, and that these may be used individually or in combination, depending upon the user. Exemplary set retarding actives may be used in the amount of 1–20% by total weight of the composition. Exemplary retarding actives include carboxylic acids (e.g., malic, tartaric, citric, gluconic, heptagluconic) and their salt form (e.g., sodium, potassium, calcium); or they may be sugars, such as sucrose, roferose, dextrose, maltose, lactose, xylose, fructose, mannose, or glucose.

The term "vegetable oil" as used herein shall mean and refer to a product (whether in liquid, paste, or solid form) extracted from the seeds, fruit, or nuts of plants and sap trees (such as hevea sap, maple, lignosulfonates, pinetree sap). Vegetable oils are generally considered to be a mixture of mixed glycerides (See e.g., Hawley's Condensed Chemical Dictionary, Ed. N. Irving Sax, Richard J. Lewis, Sr., 11th Ed. (Von Nostrand Reinhold Company, New York 1987), page 1219). Vegetable oils include but are not limited to: rapeseed oil, sunflower oil, soy bean oil, castor oil, peanut oil, grape seed oil, corn oil (e.g., including corn germ oil), canola oil, coconut oil, linseed oil, sesame oil, olive oil, palm oil, almond oil, avocado oil, china wood oil, cocoa oil, safflower oil, hemp seed oil, walnut oil, poppy seed oil, oiticaca oil (e.g., obtained by expression from the seeds of the Brazilian oiticaca tree, *Licania rigida*), palm nut oil, perilla oil, pecan oil, tung oil, and pine tar oil.

A preferred set retarder composition of the invention comprises at least one active, such as citric acid or citrate, or a sugar such as sucrose, dispersed in rapeseed oil. For example, the rapeseed oil can be in an amount of 50% or more by total weight of the composition.

Further embodiments may employ a vegetable oil derivative for dispersing the retarder active, and such a derivative may be selected from the group of mono and diglycerides of $C_6$–$C_{30}$ fatty acids, esters of $C_6$–$C_{30}$ fatty acids, ethoxylated compounds of $C_6$–$C_{30}$ fatty acids, $C_6$–$C_{30}$ fatty alcohols, $C_6$–$C_{30}$ fatty amines, $C_6$–$C_{30}$ fatty amides, and tall oil derivatives.

The list of potential vegetable oil and animal oil derivatives believed useful for purposes of the present invention is rather large. However, a helpful list is provided in World Patent Application No. WO 85/05066 (International Publication No.) of Nielsen et al., International Patent Application No. PCT/CK85,00043, beginning at page 16. The derivatives include: hexyl acetate, 2-ethylhexyl acetate, octyl acetate, isooctyl acetate, cetyl acetate, dodecyl acetate, tridecyl acetate; butyl butyrate, isobutyl butyrate, amyl isobutyrate, hexyl butyrate, heptyl butyrate, isoheptyl butyrate, octyl butyrate, isooctyl butyrate, 2-ethylhexyl butyrate, nonyl butyrate, isononyl butyrate, cetyl butyrate, isocetyl butyrate; ethyl hexanoate, propyl hexanoate, isopropyl hexanoate, butyl hexanoate, isobutyl hexanoate, amyl hexanoate, hexyl hexanoate, heptyl hexanoate, isoheptyl hexanoate, octyl hexanoate, 2-ethylhexyl hexanoate, nonyl hexanoate, isonynyl hexanoate, cetyl hexanoate, isocetyl hexanoate; methyl octanoate, ethyl octanoate, propyl octanoate, isopropyl octanoate, butyl octanoate, isobutyl octanoate, amyl octanoate, hexyl octanoate, heptyl octanoate, isoheptyl octanoate, octyl octanoate, isooctyl octanoate, 2-ethylhexyl octanoate, nonyl octanoate, isononyl octanoate, cetyl octanoate, isocetyl octanoate; methyl 2-ethylhexanoate, ethyl 2-ethylhexanoate, propyl 2-ethylhexanoate, isopropyl 2-ethylhexanoate, butyl 2-ethylhexanoate, isobutyl 2-ethylhexanoate, isoamyl 2-ethylhexanoate, hexyl 2-ethylhexanoate, heptyl 2-ethylhexanoate, isoheptyl 2-ethylhexanoate, octyl 2-ethylhexanoate, isooctyl 2-ethylhexanoate, 2-ethylhexyl 2-ethylhexanoate, nonyl 2-ethylhexanoate, isononyl 2-ethylhexanoate, cetyl 2-ethylhexanoate, isocetyl 2-ethylhexanoate; methyl decanoate, ethyl decanoate, propyl decanoate, isopropyl decanoate, butyl decanoate, isobutyl decanoate, isoamyl decanoate, hexyl decanoate, heptyl decanoate, isoheptyl decanoate, octyl decanoate, isooctyl decanoate, 2-ethylhexyl decanoate, nonyl decanoate, isononyl decanoate, cetyl decanoate, isocetyl decanoate; methyl laurate, ethyl laurate, propyl laurate, isopropyl laurate, butyl laurate, isobutyl laurate, isoamyl laurate, hexyl laurate, heptyl laurate, isoheptyl laurate, octyl laurate, isooctyl laurate, 2-ethylhexyl laurate, nonyl laurate, isononyl laurate, cetyl laurate, isocetyl laurate; ethyl oleate, propyl oleate, isopropyl oleate, butyl oleate, isobutyl oleate, isoamyl oleate, hexyl oleate, heptyl oleate, isoheptyl oleate, octyl oleate, isooctyl oleate, 2-ethylhexyl oleate, nonyl oleate, isononyl oleate, cetyl oleate, isocetyl oleate; diethyl succinate, dipropyl succinate, diisopropyl succinate, dibutyl succinate, diisobutyl succinate, diisoamyl succinate, dihexyl succinate, diheptyl succinate, diisoheptyl succinate, dioctyl succinate, diisooctyl succinate, di-2-ethylhexyl succinate, dinonyl succinate, diisononyl succinate, dicetyl succinate, diisocetyl succinate; dimethyl adipate, diethyl adipate, dipropyl adipate, diisopropyl adipate, dibutyl adipate, diisobutyl adipate, diisoamyl adipate, dihexyl adipate, diheptyl adipate, diisoheptyl adipate, dioctyl adipate, diisooctyl adipate, di-2-ethylhexyl adipate, dinonyl adipate, diisononyl adipate, dicetyl adipate, diisocetyl adipate; isopropyl myristate, isobutyl myristate, butyl myristate, amyl myristate, hexyl myristate, heptyl myristate, isoheptyl myristate, octyl myristate, 2-ethylhexyl myristate, nonyl myristate, isononyl myristate, cetyl myristate, isocetyl myristate; isopropyl palmitate, isobutyl palmitate, butyl palmitate, amyl palmitate, hexyl palmitate, heptyl palmitate, isoheptyl palmitate, octyl palmitate, 2-ethylhexyl palmitate, nonyl palmitate, isononyl palmitate, cetyl palmitate, isocetyl palmitate; isopropyl stearate, isobutyl stearate, butyl stearate, amyl stearate, hexyl stearate, heptyl stearate, isoheptyl stearate, octyl stearate, 2-ethylhexyl stearate, nonyl stearate, isononyl stearate, cetyl stearate, and isocetyl stearate.

Vegetable oils useful in the invention may be essential oils. The term "essential" means and refers to oils that contain the characteristic odor or flavor (i.e., the essence) of the original flower or fruit. An essential oil is usually obtained by steam distillation of the flowers or leaves or cold pressing of the skin or other parts (e.g., stem, flower, twigs, etc.). Exemplary essential oils include orange, grapefruit, lemon, citrus, and pinetree.

In other exemplary surface retarder compositions of the invention, at least one cement set retarding active can be dispersed in an animal oil or its derivative, which can be used instead of, or in combination with, a vegetable oil or its derivative. The term "animal oil" refers to a product (whether oil, wax, or solid form) obtained from any animal substance, such as bone or other body component. Examples include lard oil, bone oil, herring oil, cod liver oil, neatsfoot oil, sardine oil, lanoline oil, fish oil, sheep wool oil, tallow oil, and bees wax. Derivatives of animal oils preferably include mono and diglycerides of $C_6$–$C_{30}$ fatty acids, esters of $C_6$–$C_{30}$ fatty acids, ethoxylated compounds of $C_6$–$C_{30}$ fatty acids, $C_6$–$C_{30}$ fatty alcohols, $C_6$–$C_{30}$ fatty amines, $C_6$–$C_{30}$ fatty amides, and tall oil derivatives. (See also list provided above in discussion of vegetable oil derivatives).

It is further contemplated that mixtures of animal oil and vegetable oil can be employed for various purposes. For example, a pinetree oil can be used to cover or mask the smell of sheep wool oil. An exemplary surface retarder composition could comprise sunflower methylester (40%), sheep wool oil (25%), sucrose (9%), iron oxide ((2%), kieselguhr (22%), and pinetree oil (2%), all percentages based on total weight of the composition.

In further exemplary surface retarder compositions, the retarding actives may be dispersed in two or more different vegetable oils. Thus, for example, the actives may be dispersed within a continuous phase carrier comprising a vegetable oil as well as a vegetable oil derivative. The vegetable oil(s) and/or animal oil(s) function preferably as a continuous phase carrier within which to suspend one or more retarding actives (e.g., sugar(s), acids, and/or their salts) dispersed throughout as a discontinuous phase.

While the present inventors prefer that no solvents be employed in their inventive compositions, they also provide for optional use of solvents or water in addition to the vegetable and/or animal oils. Thus, optional petroleum-based solvents and/or water can be incorporated into compositions of the invention, although such is not preferred for performance or environmental reasons previously discussed.

Further exemplary surface retarder compositions of the invention can optionally include fillers, such as calcium carbonate, silicon dioxide, sand, mica, talc, clay (e.g., kaolin), barium sulfate, sodium silico-aluminates, alumina, barium carbonate, dolomite (which is a carbonate of calcium and magnesium, $CaMg(CO_3)_2$), magnesium carbonate, magnesium oxide, kieslguhr (diatomaceous earth), or a mixture of any of the foregoing. The total filler content may be, for example, 0–50% based on total weight of the surface retarder composition.

Still further exemplary surface retarder compositions of the invention may also include one or more pigments, colorants, or dyes, such as titanium dioxide, iron oxide, chromium oxide, cobalt oxide, zinc oxide, carbon black, or other pigments or colorants, in an amount of 0–30% by total weight of the composition. It is desirable to employ at least one pigment, colorant, or dye such that an applicator can visually confirm, such as during a spray application, that a particular targeted cementitious surface has been treated with the surface retarder composition.

Other exemplary surface retarder compositions of the invention may additionally include other components, such as sorbitol, boric acid (or its salt), alkylphosphates, proteins, and casein. These may further components may be used for affecting various properties of the surface retarder compositions, such as rheology, viscosity, and/or surface tension. Accordingly, further embodiments include one or more rheology modifiers and/or viscosity modifiers.

Exemplary methods of the invention comprise applying a coating of the surface retarder compositions onto a hydratable cementitious material surface, such as concrete. The composition may be applied by roller but is preferably spray-applied directly to the surface to be treated. Subsequently, the treated surface portion may be washed away, using a pressure-washer or hose, to reveal an etched portion beneath the treated, removed surface portion.

The following examples are provided for illustrative purposes only and are not intended to limit the scope of the claims.

EXAMPLE I

Three surface retarder compositions were formulated for comparative testing. One was solvent-based, a second was water-based, and a third was based on vegetable oil. The three formulations are summarized in Table 1 which identifies the component amounts based on parts per hundred weight.

TABLE 1

| Raw Material | Vegetable Oil | Solvent-based | Water-based |
| --- | --- | --- | --- |
| Retarder Active (e.g., citric acid) | 8 | 8 | 8 |
| Petroleum Distillates | 0 | 59 | 0 |
| Petroleum Resin | 0 | 25 | 0 |
| Pinetree Resin | 20 | 0 | 0 |
| Titanium Dioxide | 5 | 5 | 5 |
| Silicon Dioxide | 10 | 10 | 10 |
| Iron Oxide | 1 | 1 | 1 |
| Xanthan Gum | 0 | 0 | 0.5 |
| Vegetable Oil/methylester of . . . | 56 | 0 | 0 |
| Water | 0 | 0 | 0 |

Each of these three formulations were then applied to wet concrete surfaces by spray-coating after bleeding water was allowed to evaporate from the concrete (which usually took about 20 minutes after mixing and pouring of the concrete). The concrete was approximately 350 kg/cubic meter and had a water/cement ratio of about 0.55 using type 1 Portland cement. The inclusion of equal amounts of pigment allowed for visual approximation of equal coating thicknesses (approximately 0.2 mm.) onto surface of concrete.

Heat resilience was tested by allowing the wet spray coating to remain on the concrete surface for one day at 35° C. The surface was then sprayed with water to remove the treated portion. It was judged that the water-based surface retarder etched the surface poorly, while the solvent-based formulation was good, but the vegetable oil-based surface retarder was judged to be very good due to the deepness of the concrete surface etching. It is believed by the inventors that the vegetable oil-based surface retarder provided a wet film coating carrier that favorably enabled penetration by the retarder active into the concrete.

Next, rain resistance was tested by wet spray coating the three sample formulations onto wet concrete surfaces, waiting one hour, and then spraying water onto the treated concrete surfaces. In this test, the water-based retarder again performed poorly, while the solvent-based and vegetable oil-based surface retarder formulations demonstrated "good" performances because the depth of etching was deeper when compared to the water-based formulation. The inventors believe that this is due to the fact that the wet film coatings are not so easily washed away by the water (or rain).

A third test was done to evaluate the cold temperature efficacy of the three different sample formulations. The three formulations were applied to three different wet concrete surfaces, which were then subjected to a temperature of 5° C. for 24 hours. When the treated surface was washed away, the etching depth provided by the water-based surface retarder was judged to be "medium," while both the vegetable oil-based and solvent-based retarders allowed "good" etching depths.

Finally, the three formulations were subjected to three-day delay testing. First, a first set of all three formulations were spray-coated onto wet concrete and allowed to sit at 20° C. for three days, while a second set was applied and allowed to sit at 5° C. for three days. After washing, it was observed that in both cases the water-based surface retarder provided "poor" etching depth; the solvent-based surface retarder provided "good" etching depth; but the vegetable-oil based surface retarder gave "very good" etching depth. Again, this seemed to prove the inventors' surmise that the vegetable-oil based surface retarder provided the most favorable film coating that permitted a surface active to penetrate into the set concrete surface.

The results of these tests are provided in Table 2 below.

TABLE 2

| TEST | METHOD | Vegetable | Solvent | Water |
| --- | --- | --- | --- | --- |
| Heat resistance | 35° C., 1 day | Very good | Good | Poor |
| Rain resistance | 1 hour | Good | Good | Poor |
| Cold Temperature | 5° C., 1 day | Good | Good | Medium |
| 3 day delay at 20° C. | Delay | Very good | Good | Poor |
| 3 day delay at 5° C. | Delay | Very good | Good | Poor |

EXAMPLE II

The amount of water lost by the concrete was tested by coating the three formulations onto three different concrete surface samples. The curing effect, in terms of water lost per square meter in 78 hours, was tested in accordance with ASTM C309. It was determined that for the water-based surface retarder formulation, water loss was 2500 gms, while water loss for both the vegetable oil-based and solvent-based formulations, water loss was 1000 gms. These results are summarized in Table 3 below, which also provides estimates for biodegradability (pursuant to ISO 9408) and flammability (when sample is put into small cup).

TABLE 3

| TEST | METHOD | Vegetable | Solvent | Water |
|---|---|---|---|---|
| Curing effect (lost water/m² in 78 hours) | ASTM C309 | 1000 | 1000 | 2500 |
| Biodegradability | ISO 9408 | >60% at 28 days | <60% at 28 days | >60% at 28 days |
| VOC content | | 0% | 59% | 0% |
| Flammability | Flash point C° | >100 | 6 | n.a. |

Accordingly, these tests reveal that the vegetable-oil based surface retarder formulation is environmentally sound.

EXAMPLE III

Different formulations using various surface retarding actives, of both the sugar and acid/salt variety were tested, using various vegetable oils and vegetable oil derivative combinations, in comparison with solvent-based and water-based formulations. Retarder actives were also used in combination as well as individually. Animal oils were also tested. In most cases, the results were similar to those discussed above.

The foregoing examples and embodiments were present for illustrative purposes only and not intended to limit the scope of the invention.

We claim:

1. A method for treating the surface of a hydratable cementitious composition, comprising:
   providing a hydratable cementitious composition having a surface to be etched, said hydratable cementitious composition comprising a hydratable cement binder comprising Portland cement, masonry cement, or mortar cement, and water; said hydratable cementitious composition further comprising an aggregate selected from the group consisting of sand, crushed gravel, and stone;
   applying a coating composition onto a surface of said cementitious composition, said coating composition comprising at least one cement set retarding active component dispersed in a vegetable oil or derivative thereof, an animal oil or derivative thereof, or a mixture of said oils or derivatives thereof; and
   washing away a portion of said surface of said cementitious composition coated with said coating composition using a pressure-washer or hose, thereby revealing an etched portion in said cementitious composition comprising said aggregate.

2. The method of claim 1 wherein said vegetable oil, said animal oil, or mixture or derivative thereof is present in an amount not less than 1% and not greater than 98% based on total weight of said coating composition.

3. The method of claim 1 wherein said vegetable oil, said animal oil, or mixture or derivative thereof is present in an amount not less than 25% and not greater than 92% based on total weight of said coating composition.

4. The method of claim 1 wherein said vegetable oil, said animal oil, or mixture or derivative thereof is present in an amount not less than 50% and not greater than 90% based on total weight of said coating composition.

5. The method of claim 4 wherein said at least one cement set retarding active component is dispersed in a vegetable oil.

6. The method of claim 5 wherein said vegetable oil is selected from the group consisting of rapeseed oil, sunflower oil, soy bean oil, castor oil, peanut oil, grape seed oil, corn oil, canola oil, coconut oil, linseed oil, sesame oil, olive oil, palm oil, almond oil, avocado oil, china wood oil, cocoa oil, safflower oil, hemp seed oil, walnut oil, poppy seed oil, oiticaca oil, palm nut oil, perilla oil, pecan oil, tung oil, and pine tar oil.

7. The method of claim 1 wherein said vegetable oil comprises at least 50% by total weight of rapeseed oil.

8. The method of claim 1 wherein said at least one cement set retarding active component is dispersed in a vegetable oil or derivative thereof.

9. The method of claim 8 wherein said vegetable oil derivative comprises one or more materials selected from the group consisting of mono and diglycerides of $C_6$–$C_{30}$ fatty acids, esters of $C_6$–$C_{30}$ fatty acids, ethoxylated compounds of $C_6$–$C_{30}$ fatty acids, $C_6$–$C_{30}$ fatty alcohols, $C_6$–$C_{30}$ fatty amines, $C_6$–$C_{30}$ fatty amides, and tall oil derivatives.

10. The method of claim 1 wherein said at least one cement set retarding active component is dispersed in a vegetable oil or derivative thereof, and said vegetable oil or derivative being an essential oil.

11. The method of claim 1 wherein said essential oil is selected from the essences of orange, grapefruit, lemon, citrus, and pinetree.

12. The method of claim 1 wherein said at least one cement set retarding active component is dispersed in an animal oil selected from the group consisting of lard oil, bone oil, herring oil, cod liver oil, neatsfoot oil, sardine oil, lanoline oil, fish oil, sheep wool oil, and tallow oil.

13. The method of claim 12 wherein said animal oil contains a material selected from the group consisting of mono and diglycerides of $C_6$–$C_{30}$ fatty acids, esters of $C_6$–$C_{30}$ fatty acids, ethoxylated, compounds of $C_6$–$C_{30}$ fatty acids, $C_6$–$C_{30}$ fatty alcohols, $C_6$–$C_{30}$ fatty amines, $C_6$–$C_{30}$ fatty amides, and tall oil derivatives.

14. The method of claim 1 wherein said composition comprises at least two different vegetable oils, or a vegetable oil and a vegetable oil derivative.

15. The method of claim 1 wherein said at least one cement set retarding active component is a sugar, or an acid or salt thereof.

16. The method of claim 15 wherein said at least one cement set retarding active component is present in an amount not less than 1% and not greater than 20% by total weight of the composition.

17. The method of claim 16 wherein said at least one cement set retarding active component is selected from the group consisting of carboxylic acid or its salt, malic acid or its salt, tartaric acid or its salt, citric acid or its salt, gluconic acid or its salt, heptagluconic acid or its salt.

18. The method of claim 16 wherein said at least one cement set retarding active component is a sugar.

19. The method of claim 18 wherein said sugar is selected from the group consisting of sucrose, roferose, dextrose, maltose, lactose, xylose, fructose, mannose, and glucose.

20. The method of claim 1 further comprising water or petroleum-based solvent.

21. The method of claim 1 further comprising a pigment, colorant, dye, filler, rheology modifier, viscosity modifier, or mixture thereof.

22. The method of claim 3 wherein said coating composition comprises mixture of said vegetable oil or derivative thereof and said animal oil or derivative thereof.

23. A method for treating the surface of a hydratable cementitious composition, comprising:
   (A) providing a hydratable cementitious composition having a surface to be etched, said hydratable cementitious composition comprising a hydratable cement binder comprising Portland cement, masonry cement, or mortar cement, and water;
   said hydratable cementitious composition further comprising an aggregate selected from the group consisting of sand, crushed gravel, and stone;
   (B) applying a coating composition onto a surface of said cementitious composition, wherein
      said coating composition comprises at least one cement set retarding active component present in an amount not less than 1% and not greater than 20% by total weight of said coating composition, said at least one cement set retarding active component being dispersed in an oil carrier which is present in an amount not less than 25% and not greater than 92% based on total weight of said coating composition, and said oil carrier comprising at least two different vegetable oils or a vegetable oil and a vegetable oil derivative, and at least one animal oil;
   said at least one cement set retarding active component being selected from the group consisting of carboxylic acid or its salt, malic acid or its salt, tartaric acid or its salt, citric acid or its salt, gluconic acid or its salt, heptagluconic acid or its salt; and
   said coating composition further comprising a pigment, colorant, dye, or mixture thereof, and said coating composition further comprising a filler, rheology modifier, viscosity modifier, or mixture thereof; and
   (C) washing away a portion of said surface of said cementitious composition coated with said coating composition using a pressure-washer or hose, thereby revealing an etched portion in said cementitious composition comprising said aggregate.

* * * * *